United States Patent [19]

Magnus et al.

[11] Patent Number: 4,644,048

[45] Date of Patent: Feb. 17, 1987

[54] SELF-COMPATIBILIZING PHTHALATE-BASED POLYESTER POLYOLS

[75] Inventors: George Magnus, Arlington Heights; Melvin Loeb, Northbrook; Robert J. Wood, Round Lake Park, all of Ill.

[73] Assignee: Stepan Company, Northfield, Ill.

[21] Appl. No.: 754,832

[22] Filed: Jul. 12, 1985

[51] Int. Cl.$^4$ ............................................. C08G 63/18
[52] U.S. Cl. .................................... 528/176; 528/194; 528/195; 528/288; 528/291; 528/295.3; 528/295.5; 528/301; 528/304; 528/305; 528/308; 528/308.7
[58] Field of Search ............... 528/194, 176, 195, 288, 528/291, 295.3, 295.5, 301, 304, 305, 308, 308.7

[56] References Cited

U.S. PATENT DOCUMENTS

| | | |
|---|---|---|
| 3,298,974 | 1/1967 | Bernstein et al. ................ 521/131 |
| 4,246,364 | 1/1981 | Koehler et al. ................... 521/167 |
| 4,451,641 | 5/1984 | Sublett et al. ................... 528/295.5 |
| 4,529,744 | 7/1985 | Wood ................................ 521/131 |
| 4,540,751 | 9/1985 | Lynch et al. .................... 528/295.5 |

*Primary Examiner*—Maurice J. Welsh
*Attorney, Agent, or Firm*—Hill, Van Santen, Steadman & Simpson

[57] ABSTRACT

Phthalate polyester polyols comprising reaction products of a phthalic acid compound, a low molecular weight diol compound and a hydrophobic compound and a nonionic surfactant compound are provided which are compatible with fluorocarbon blowing agents and which possess a variety of other desirable characteristics. The polyols are producible by a simple heating process and are blendable with various conventional polyols and other additives to make resin prepolymer blends which can be catalytically reacted with organic isocyanates to produce cellular polyurethanes and polyurethane/polyisocyanurates.

25 Claims, No Drawings

SELF-COMPATIBILIZING PHTHALATE-BASED POLYESTER POLYOLS

BACKGROUND OF THE INVENTION

1. Field Of The Invention

This invention lies in the field of polyols useful in formulating resin prepolymer blends for reaction with organic isocyanates to produce polyurethane and/or polyurethane-polyisocyanurate cellular polymers, and, more particularly, in the field of phthalate polyester polyols which are compatible with high levels of fluorocarbon blowing agents.

2. Prior Art

Aromatic polyester polyols are coming into widespread usage in the manufacture of polyurethane and polyurethane-polyisocyanurate foams. Such polyester polyols are attractive because they tend to be low in cost, yet can produce rigid cellular polymers of excellent properties adapted for many end use applications.

One class of aromatic polyester polyols which has recently become commercially available comprises esters produced by esterifying phthalic acid or phthalic acid anhydride with an aliphatic polyhydric alcohol. For example, a diethylene glycol phthalate is available commercially from Stepan Company, Northfield, Ill. Such liquid product has a desirably low viscosity, a desirably high aromatic ring content, and a desirably low acid number. Even though such product typically has a reactive hydrogen functionality of less than about 3, it catalytically reacts well with organic isocyanates to produce, for example, rigid cellular polyurethane-polyisocyanurate polymer that can have commercially acceptable characteristics.

One problem with most such commercially viable aromatic polyester polyols is that they characteristically are poorly compatible with fluorocarbon compounds of the type conventionally used as blowing agents to make such cellular polymers.

The usual solution to this problem has been to admix with such a polyol a compatibilizing agent in an amount sufficient to produce a resulting mixture with a desired amount of compatibility (solubility) for fluorocarbons. For examples, Koehler et al U.S. Pat. No. 4,246,364 use a class of amide diols, while Wood U.S. Ser. No. 622,670 filed June 20, 1984 (now allowed U.S. Pat. No. 4,529,744) uses a combination of relatively high molecular weight propoxylate ethoxylate compounds with amine and/or amide diol compounds. The amide diols employed by Wood are similar to those taught by Koehler et al. The propoxylate ethoxylate compounds employed by Wood are, in fact, similar to those employed in one preferred mode of practicing the present invention, as hereinbelow described.

The necessity to compound a fluorocarbon compatibilizing agent with aromatic polyester polyol means an extra cost in the formulation of a so-called resin prepolymer blend. Such resin prepolymer blends are conventionally employed in the trade for reaction with organic isocyanates to produce polyurethane and/or polyurethane-polyisocyanurate cellular polymers. Resin prepolymer blends are uniform, homogeneous liquid compositions comprised of polyol, urethane-forming and/or isocyanurate-forming catalyst, fluorocarbon blowing agent, other optional additives, and, in the case of aromatic polyester polyols, a fluorocarbon compatibilizing agent, as is well known to those skilled in the art. A desired quantity of a compatibilizing agent is blended with an aromatic polyester polyol before such fluorocarbon is added, and such a blending step itself adds to the cost of resin prepolymer blend manufacture.

However, the cost of a compatibilizing agent is even more significant. Moreover, the costs of such an agent are escalating. For example, the cost of the cochin oil, which is used as a starting material to make the amide diol above identified, increased by approximately 60 percent in price in 1984. Unless the cost of producing resin prepolymer blends of aromatic polyester polyols can be controlled and maintained at economically competitive levels, aromatic polyester polyols will not have a commercial place in this field.

There is a need for fluorocarbon compatibilized aromatic polyester polyols which not only are economical to produce, but also are convertible into cellular foams having excellent properties.

Aromatic polyester polyols, especially phthalate polyester polyols, are producible by esterifying aromatic polycarboxylic acids with polyols, as is known. The idea of somehow modifying the components without substantially increasing costs so as to result in a polyol that is directly compatible (self-compatibilized) with fluorocarbons is certainly attractive. Not only would this avoid the need for a separate compatibilizing agent blending step, but also this would avoid the cost of an added compatibilizing agent.

Bernstein U.S. Pat. No. 3,298,974 provides a prior art attempt to prepare an aromatic polyester polyol which would be compatible with fluorocarbons. The Bernstein teachings recognize the desirability of using phthalic anhydride as a dicarboxylic acid for use in making a polyester polyol, but, for his esterification polyol, he employed only polyols containing at least 3 hydroxyl groups per molecule. To avoid the resulting high viscosity problems, use of an aliphatic dicarboxylic acid e.g., adipic acid, to replace portions of the phthalic anhydride is mentioned (see column 1, lines 20–45) as prior art. However, in the '964 patent, Bernstein describes polyester polyols produced by reacting a polycarboxylic acid of which aromatic dicarboxylic acid constitutes at least 25% by weight with an ethylene oxide adduct of an aliphatic polyhydric alcohol initially containing from 3 to 6 hydroxyl groups so that the resulting adduct contained 10 to 22 milliequivalents per gram of hydroxyl groups. Such a polyester polyol product was said to display increased fluorocarbon solubility and was said to be formed in the presence of some "higher molecular weight monocarboxylic or fatty acid" (see column 4, lines 25–43). Bernstein never taught low molecular weight diols for reaction with phthalic anhydride. The Bernstein polyester polyols are evidently not suitable for use in producing cellular polyurethane-polyisocyanurate type polymers of commercially acceptable quality. Apparently, these Bernstein products have never been successfully commercialized.

Windemuth et al British Pat. No. 908,337 describes "reacting at least one polyhydroxyl and/or polycarboxylic compound with a molecular weight greater than 300 ... with more than twice the quantity of polyisocyanate which is required for reaction" with the objective being to employ "a large excess of polyisocyanate" (see page 1, column 2, lines 62–84). Within "another large group of suitable starting materials (that) comprises linear or branched polyesters containing OH and/or COOH groups" phthalic acid and diethylene glycol are listed among many other compounds, and it is then stated that: "Polyesters . . . obtained from the aforesaid . . . can of course also be modified with monofunctional alcohols, amines, carboxylic acids, or saturated or unsaturated fatty acids, such as for example oleic acid." (see page 3, column 1, line 57 through column 2, line 90). Elsewhere it is indicated that such modifiers are added to reduce viscosity (see page 2, column 1, lines 18-46). No discussion of fluorocarbon compatibility whatever appears in Windemuth et al, and no phthalate polyester polyols made only of phthalic anhydride, low molecular weight diol, and such modifier is shown. The only phthalate containing polyester polyol illustrated appears in Example 35, and this polyol is "a mixture of 70 parts by weight of a polyester of 3 moles of polypropylene glycol (OH number 270) and 2 moles of adipic acid (acid number 2, OH number 84), 30 parts by weight of a polyester of 2 moles of phthalic acid anhydride, 1 mole of adipic acid, 1 mole of oleic acid and 5.3 moles of trimethylolpropane (OH number 353, acid number 0.5)" (see page 19, column 2, line 24 through page 20, column 1, line 5). The exemplified Windemuth et al aromatic polyester polyol systems are evidently not suitable for use in producing cellular polyurethane-polyisocyanurate type polymers of commercially acceptable quality, and apparently such have never been successfully commercialized.

So far as is known, no one has heretofore produced a class of phthalate polyester polyols which is both fluorocarbon self-compatibilizing, and also has a combination of low viscosity, low acid number, low reactive hydroxyl functionality (less than 3), and high aromatic ring content. Such a phthalate polyester polyol can be formulated into a resin prepolymer blend and then reacted with organic isocyanate to produce cellular polyurethane-polyisocyanurate type polymers of generally commercially acceptable quality.

BRIEF SUMMARY OF THE INVENTION

More particularly, this invention relates to a new and surprisingly useful class of phthalate polyester polyol blends comprised of reaction products of (a) phthalate acid compounds, (b) low molecular weight aliphatic diol compounds, and (c) a mixture of certain hydrophobic compounds with certain nonionic surfactant compounds. The invention also relates to methods for making and using such phthalate polyester polyols, and further relates to cellular polyurethane and polyurethane/polyisocyanurate foams made therewith.

The polyol blends of this invention are self-compatibilized, and, in addition, have a desirable combination of other characteristics which make them useful precursors for producing cellular polyurethane and/or polyurethanepolyisocyanurates. So far as is known, no prior art phthalate polyester polyol blend has such a surprising combination of self-compatibility with other desirable properties.

In relation to phthalate polyester polyol blends which are reaction products of either:

(a) phthalate acid compounds, low molecular weight aliphatic diol compounds, and certain hydrophobic compounds, or (b) phthalate acid compounds, low molecular weight aliphatic diol compounds, and certain nonionic surfactant compounds, the phthalate polyester polyol blends of this invention can be regarded as being synergistically enhanced in properties by reason of the presence therein of the indicated modifier mixture of such hydrophobic compounds and such nonionic surfactant compounds. Thus, the polyol blends of this invention display a characteristic improvement in fluorocarbon compatibility (solubility) which is surprisingly better than the fluorocarbon compatibility achievable with either of such other above indicated reaction products when equivalent contents of the individual respective modifier types are incorporated thereinto. Also, the polyol blends of this invention provide characteristic improvements in the properties of cellular polyurethane/polyisocyanurate polymers made therefrom by catalytic reaction with polymeric isocyanates which are surprisingly better than the corresponding properties which are achievable in similar cellular polymers made from either of such other above indicated polyol reaction products. Such improved product properties include, for example, tumble friability, compressive strength, and the like.

The phthalate polyester polyols of the present invention are readily compoundable generally with prior art polyols, if desired, and also with the various additives conventionally used in the formulation of resin prepolymer blends.

The polyol blends of this invention are prepared by an esterification process which is simple, reliable, and well adapted for practice with conventional chemical processing equipment.

Other and further aims, purposes, features, objects, advantages, utilities, embodiments, and the like will be apparent to those skilled in the art from the teachings of the present specification taken with the appended claims.

DETAILED DESCRIPTION

Polyol Blend Characteristics

The phthalate polyester polyol blends of this invention, as indicated, are made using low molecular weight aliphatic diols. The present polyol blends differ from the above referenced prior art phthalate esters with low molecular weight aliphatic diols, such as diethylene glycol phthalate, in that, in effect, a portion of the low molecular weight diol needed to achieve a desired (theoretical) stoichiometry between the diol and the dibasic phthalate acid (or phthalic anhydride) is replaced by the mixture of hydrophobic compounds and nonionic surfactant compounds. Thus, the quantity of aromatic rings present in a product modified phthalate ester polyol is maintainable at a level closely related to that in corresponding unmodified phthalate ester polyols, but the quantity and nature of the aliphatic radicals present in a product polyol are altered to an extent desirable or necessary (the exact amount depending upon user wishes) to achieve fluorocarbon compatibilization with favorable product polyol properties and favorable cellular foam properties. Thus, these product polyol blends are characterized by a surprising combination of properties, as now explained.

Most importantly, the product polyol blends are surprisingly fluorocarbon compatibilized so that they can be formulated into resin prepolymer blends with little or preferably no added compatibilizing agent in order to produce a desired level of fluorocarbon solubility therein. Such a self-compatibilization is achieved easily and simply by incorporating relatively inexpensive hydrophobic and nonionic surfactant material into a starting mixture of phthalic acid compounds and low molecular weight aliphatic diols, as hereinbelow explained.

For another thing, these product polyol blends have relatively low viscosities. Viscosities typically fall in the range from about 200 to 50,000 centipoises (measured, for example, at 25° C. with a Brookfield viscometer such as a Model LVT) as is desirable for many end use applications for polyols being used in the manufacture of polyurethane and/or polyurethane/polyisocyanurate cellular products. If desired, the viscosity of a product blend of the present invention can be increased to some desired extent through incorporation into the starting mixture used for esterification a quantity of a polyfunctional (that is, having a functionality higher than 2) carboxylic acid or alcohol, as taught herein.

For another thing, these product blends characteristically have favorable product properties including, for example, compressive strength, tumble friability, and the like.

For another thing, these product blends are surprisingly capable of dissolving thereinto significant quantities of relatively high molecular weight propoxylate ethoxylate compounds without gelation upon subsequent addition of fluorocarbon. Thus, while Wood has discovered that such propoxylate ethoxylate compounds are useful fluorocarbon compatibilizing agents (as taught in the aforereferenced Wood U.S. Ser. No. 622,670 and also in Wood U.S. Ser. No. 725,394 filed Apr. 22, 1985), such propoxylate ethoxylate compounds are prone to cause gelation upon subsequent addition of fluorocarbon of a phthalate polyester polyol composition particularly at high use rates. Although such gelation apparently can be overcome by the additional presence of certain other agents, such as an amide diol, the need for such an additional agent is potentially objectionable because of the costs involved. A propoxylate ethoxylate compound can be dissolved in a phthalate polyester polyol blend of this invention without causing gelation upon subsequent addition of fluorocarbon, and without the need for also adding a further additonal agent, and the resulting mixture displays excellent and improved fluorocarbon compatibility characteristics.

In a further development of the present invention, there is provided a preferred class of phthalate polyester polyol blends which are prepared by incorporating into a starting esterification reaction mixture, in accordance with this invention, a high molecular weight nonionic surfactant which is a propoxylate ethoxylate compound. Such propoxylate ethoxylate compound becomes at least partially chemically reacted into the product phthalate polyester polyol blend during the esterification. The resulting product blend displays excellent and improved fluorocarbon compatibility characteristics, and cellular polymers produced therefrom display excellent tumble friability characteristics. Also, such a product blend appears to have a lower freezing temperature than corresponding blends produced by merely admixed thereinto after the esterification an equivalent amount of the same propoxylate ethoxylate compound, which is believed to avoid certain processing problems and storage problems in winter. Further, if desired, additional quantities of such propoxylate ethoxylate compound can be admixed with such a product polyol blend after esterification without adding some additional agent and without causing gelation upon subsequent addition of fluorocarbon.

The phthalate polyester polyol blends of the present invention which contain such reacted and/or unreacted high molecular weight propoxylate ethoxylate compounds have an unusual and surprising ability to form, when catalytically reacted with organic isocyanates, cellular foams of not only superior tumble friability, but also superior uniform small sized cell structure.

In general, a self-compatibilized phthalate polyester polyol blend of this invention comprises the reaction product of a mixture which comprises on a 100 mole percent total basis:

(A) from about 15 to 40 mole percent of at least one phthalic acidic material selected from the group consisting of phthalic anhydride, phthalic acid, isophthalic acid, terephthalic acid, and mixtures thereof, (B) from about 40 to 75 mole percent of at least one low molecular weight aliphatic diol characterized by the generic formula:

$$HO-R^1-OH \qquad (1)$$

where: $R^1$ is a divalent radical selected from the group consisting of
  (a) alkylene radicals each containing from 2 through 6 carbon atoms, and
  (b) radicals of the formula:

$$-(R^3O)_n-R^3- \qquad (2)$$

where: $R^3$ is an alkylene radical containing from 2 through 3 carbon atoms, and n is an integer of from 1 through 3, and
  (c) mixtures thereof, and
(C) from about 0.4 to 28 mole percent of a mixture of:
  (a) least one hydrophobic compound which is characterized by:
    (1) having an equivalent weight of from about 130 to 900,
    (2) containing from about 8 to 60 carbon atoms per molecule, and
    (3) containing at least one and not more than four radicals per molecule, said radicals being selected from the group consisting of carboxyl, hydroxyl, and mixtures thereof, and
  (b) at least one nonionic surfactant compound which is characterized by:
    (1) containing from about 10 to 600 carbon atoms per molecule,
    (2) containing at least one and not more than four hydroxyl radicals per molecule,
    (3) containing from about 4 to 240 radicals per molecule of the formula $$-(R^3O)-$$

where: $R^3$ is as above defined,
the weight ratio in such mixture of said hydrophobic compound to said nonionic surfactant compound being in the range from about 0.1 to 10 to 1.

Preparation Conditions

In general, a self-compatibilized phthalate polyester polyol blend of this invention is prepared by heating at a temperature ranging from about 180° to 240° C. a starting mixture as above characterized.

Such heating of a starting mixture is continued until a liquid reaction product is produced which is characterized by having:

(A) an hydroxyl number ranging from about 200 to 500, (B) an acid number ranging from about 0.1 to 7, (C) a saponification value)* ranging from about 130 to 400, and (D) a viscosity ranging from about 200 to 50,000 centipoises measured at 25° C. using a Brookfield viscometer.

*The "saponification value" is defined by the number of milligrams of potassium hydroxide required to react with the ester groups present in one gram of sample. To determine saponification value, the American Chemist'Society official Method no. C-d-3-25 is employed.

Reaction (heating) time can vary, but typically ranges from about 8 to 16 hours, but longer and shorter reaction times can result depending upon temperature, starting mixture composition, and like factors, without departing from the invention.

Process conditions are summarized in Table I below:

TABLE I

| CONDITION | Process Conditions* | |
|---|---|---|
| | BROAD | PREFERRED |
| 1. Temperature | 180–225° | 210–230° C. |
| 2. Pressure | 10 to 760 mm of Hg | autogeneous |

*The reactants are agitated during processing and preferably sparged with an inert gas (e.g. nitrogen) to aid in the removal of water vapor.

Starting Mixture

The composition comprising a starting mixture employed in the practice of this invention (as indicated above) is summarized in Table II below:

TABLE II

Starting Mixture (100 mole % total basis)*

| Item | Reactive Component | Broad | Preferred | More Preferred |
|---|---|---|---|---|
| 1. | phthalate acidic material | 15–40 | 20–35 | 25–35 |
| 2. | aliphatic diol | 40–75 | 45–65 | 50–60 |
| 3. | hydrophobic compound | 0.5–28 | 2–20 | 5–15 |
| 4. | nonionic surfactant compound | 1–17 | 2–15 | 2–10 |
| 5. | high molecular weight propoxylate ethoxylate compound | 0–1 | 0–0.8 | 0–0.5 |
| 6. | aliphatic polyol (other than diols) | 0–5 | 0–4 | 0–3 |
| 7. | polycarboxylated aromatic acid compound (other than dicarboxylated) | 0–10 | 0–8 | 0–5 |
| 8. | polycarboxylated aliphatic acid compound | 0–10 | 0–8 | 0–5 |
| 9. | phthalic anhydride bottoms composition | 0–25 | 0–20 | 0–10 |

*Values herein identified for any given mixture must conform with the composition limits disclosed above for polyol blends of this invention.

A starting mixture always contains phthalic acidic material, aliphatic diol, hydrophobic compound, and nonionic surfactant compound as shown in Table II.

A presently preferred phthalate acidic material (item 1 of Table II) comprises phthalic anhdyride. Mixtures of such phthalic acidic materials can be employed if desired.

In place of a relative pure starting phthalic acid material, one can employ a mixture of phthalic acid materials. One presently preferred such mixture comprises a phthalic anhydride bottoms composition. Such a composition is described and characterized (including preferences) in the Magnus U.S. Pat. No. 4,521,611 issued June 4, 1985. Such bottoms composition can be used in admixture with any phthalic acid starting material in any proportion desired, within the total quantity ranges above indicated.

Examples of suitable aliphatic diols of formula (1) include ethylene glycol, propylene glycol, dipropylene glycol, trimethylene glycol, butylene glycols, 1,2-cyclohexanediol, poly (oxyalkylene) polyols each containing from two to three carbon atoms derived by the condensation of ethylene oxide, propylene oxide, or any combination thereof, and the like. As those skilled in the art will appreciate, in the preparation of mixed poly(oxyethylene-oxypropylene) polyols, the ethylene and propylene oxides may be added to a starting hydroxyl-containing reactant either in admixture or sequentially. Mixtures of such diols can be employed, if desired. A presently most preferred aliphatic diol of formula (1) is diethylene glycol.

By the term "hydrophobic compound" reference herein is had to a compound which contains a substantially nonpolar organic moiety that results in such compound being substantially water insoluble and contains an active hydrogen group, such as an hydroxyl group or a carboxyl group.

Any hydrophobic compound can be employed, such as carboxylic acids (especially fatty acids), derivative of lower alkanol esters of carboxylic acids (especially fatty acid esters and amides), triglycerides (especially fats and oils), alkyl alcohols (for example, those containing from 6 to 18 carbon atoms per molecule), phenols, substituted phenols, for example, alkyl phenols, any polyalkylene glycols with greater than three carbon atoms per repeating unit, such as and the like. Mixtures of different hydrophobic compounds can be employed if desired.

Examples of fatty acids include caproic, caprylic, capric, lauric, myristic, palmitic, stearic, oleic, linoleic, linolenic, ricinoleic mixtures thereof, and the like.

Examples of fatty acid methyl esters include methyl caproate, methyl caprylate, methyl caprate, methyl laurate, methyl myristate, methyl palmitate, methyl oleate, methyl stearate, methyl linoleate, methyl linolenate, mixtures thereof, and the like.

Examples of alkyl alcohols include decyl, oleyl, cetyl, isodecyl, tridecyl, lauryl, and mixed mixtures thereof, and the like.

Examples of fats and oils include castor, coconut (including cochin), corn, cottonseed, linseed, olive, palm, palm kernel, peanut, safflower, soybean, sunflower, tall oil, tallow, mixtures thereof and the like.

Other suitable acids include dimer acid, 2-ethyl hexanoic acid, and the like.

Presently preferred types of hydrophobic compounds include alkyl alcohols, fats and oils, and the like. Examples of particular presently preferred such hydrophobic compounds include decyl alcohol, soybean oil, and the like.

By the term "nonionic surfactant" reference herein is had to a compound which contains both a hydrophobic moiety and a hydrophilic moiety and which has no moieties which dissociate in aqueous solution or dispersion into cations or anions.

Any nonionic surfactant compound can be employed. In general, in the practice of the present invention, it is preferred that the nonionic surfactant contain from about 4 to 240 individual oxyalkylene groups per molecule with the oxyalkylene groups typically being selected from the group consisting of oxyethylene and oxypropylene.

The hydrophobic portion of a nonionic surfactant is preferably derived from at least one starting compound which is selected from the group consisting of:

(a) Fatty alcohols containing from about 6 to 18 carbon atoms each,
(b) Fatty amides containing from about 6 to 18 carbon atoms each,
(c) Fatty amines containing from about 6 to 18 carbon atoms each,
(d) Fatty acids containing from 6 to 18 carbon atoms each,
(e) Phenols and/or alkyl phenols wherein the alkyl group contains from about 4 to 16 carbon atoms each,
(f) Fats and oils containing from 6 to about 60 carbon atoms each, and
(g) polyoxypropylene glycols containing from 10 to 70 moles of propylene oxide, and
(h) mixtures thereof.

In making a nonionic surfactant, such a starting compound is sufficiently alkoxylated to provide a desired hydrophilic portion. Typically, alkoxylation results in chains totaling from about 3 to 125 moles of alkylene oxide per molecule with the alkylene oxide preferably being selected from the group consisting of ethylene oxide, propylene oxide, and mixtures thereof.

One class of nonionic surfactants employable in the practice of this invention is characterized by the formula:

$$RO(CH_2CH_2O)_nH \qquad (3)$$

where:
R is a radical selected from the group consisting of alkyl phenyl radicals wherein the alkyl group in each such radical contains about five to eighteen carbon atoms, alkyl radicals each containing from two through eighteen carbon atoms, and
n is a positive whole number which is sufficient to keep the molecular weight of the product surfactant below about 1500.

It is presently preferred that nonionic surfactants employable in the practice of the present invention be characterized by containing block units of ethylene oxide and of propylene oxide. Thus the hydrophobic part of a molecule contains recurring propylene oxide units, or, in some cases, mixed units of largely propylene oxide with some ethylene oxide. Thus, nonionic surfactants employed in the practice of this invention can contain either or both condensed ethylene oxide and propylene oxide units.

One preferred class of nonionic surfactants comprises at least one relatively high molecular weight propoxylate ethoxylate compound having a molecular weight ranging from about 1500 to 12000. Preferably such a compound contains at least one block polyoxypropylene group containing at least about 10 propoxy units and also at least one block polyoxyethylene group containing at least about 20 ethoxy units.

One particularly preferred class of nonionic surfactant is characterized by having:
(1) a molecular weight of at least from about 3000 to 5000
(2) a solubility in diethylene glycol phthalate to such an extent that at least 5 parts by weight are soluble in each 100 parts by weight of a diethylene glycol phthalate (which is a stoichiometric reaction product of one mole of phthalic acid anhydride with two moles of diethylene glycol (or equivalent),
(3) at least one block polyoxypropylene group which contains from about 10 to 70 repeating propoxy units,
(4) at least one block polyoxyethylene group which contains from about 15 to 200 repeating ethoxy units, and
(5) both a hydrophobic moiety and a hydrophilic moiety, and In such a nonionic surfactant as above characterized, the total alkoxyl content must include at least 40 weight percent of ethylene oxide, and preferably the ethylene oxide content ranges from about 55 to 75 weight percent, and most preferably the ethylene oxide content ranges from about 60 to 70 weight percent. Preferably such a nonionic surfactant is end capped with at least one ethylene oxide group.

In general, a "low molecular weight nonionic surfactant compound" references herein such a compound which has a molecular weight below about 2000.

Optionally, after its formation by a heating step as described herein, a liquid product blend of this invention can be admixed with and/or have dissolved or dispersed therein, for each 100 parts by weight of such liquid polyol blend, from 0 to about 30 parts by weight of at least one such high molecular weight propoxylate ethoxylate compound. Such an admixture and dissolution is preferably carried out while maintaining a temperature ranging from about 50° to 100° C.

However, the total quantity of such propoxylate ethoxylate compound present in such a product polyol blend, whether such compound is present during such heating or is subsequently admixed with such a polyol blend, as indicated, ranges from greater than 0 to 30 weight percent on a 100 weight percent total liquid reaction product basis.

In addition to such phthalate acid compound, such aliphatic diol, such hydrophobic compound, and such nonionic surfactant compound, a starting mixture can also, if desired, contain minor amounts of certain other reactive components, such as polyhydroxylated and polycarboxylated compounds, that is, compounds having three or more functional hydroxyl and/or carboxyl groups per molecule. Such compounds can be used to increase and to regulate viscosity of a product polyol blend. Thus, polyols (especially aliphatic polyols), polycarboxylated aromatic acid compounds, and polycarboxylated aliphatic acid compounds can be employed, as shown in Table II above.

Thus, optionally, and for example, such a starting mixture can incorporate low molecular weight polyols (that is, compounds which preferably contain less than 6 carbon atoms per molecule but which contain at least three hydroxyl groups per molecule) Examples of such polyols comprise glycerol, 1,1,1-trimethylolpropane, 1,1,1-trimethylolethane, pentaerythritol, sorbitol, mixtures thereof, and the like.

Also, optionally, and for example, such a starting mixture can incorporate aromatic polycarboxylic acid or acid anhydride compounds (that is, aromatic carboxylated compounds which contain at least three carboxyl groups per molecule (including anhydrides) and which preferably contain less than 13 carbon atoms per molecule) Examples of such aromatic polycarboxylated acid compounds comprise trimellitic anhydride, trimellitic acid, mixtures thereof, and the like.

Further, optionally, and for example, such a starting mixture can incorporate aliphatic polycarboxylic acid or acid anhydride compounds (that is, aliphatic carboxylated compounds which contain at least two carboxyl groups per molecule (including anhydrides) and which preferably contain less than 8 carbon atoms per molecule) Examples of such aliphatic polycarboxylated acid compounds comprise adipic acid, glutoric acid, succinic acid, mixtures thereof, and the like.

Phthalate Polyester Polyol Blends

A liquid product blend of this invention prepared from a starting mixture as above described using preparation conditions as above described has characteristics as above indicated and as further summmarized in Table III below:

TABLE III

Product Phthalate Polyester Polyol Blends

| Item | Characteristic or Property | Range Broad | Preferred | More Preferred |
|---|---|---|---|---|
| 1. | hydroxyl number | 200–500 | 225–400 | 250–300 |
| 2. | acid number | 0.10–7.0 | 0.2–5.0 | 1.0–3.0 |
| 3. | Saponification value | 130–400 | 150–350 | 250–310 |
| 4. | viscosity (centipoises)* | 200–50,000 | 500–20,000 | 1000–5000 |

*measured with a Brookfield at 25° C.

In general, a polyol blend of this invention is a reaction product of the respective indicated quantities of starting (a) phthalate acidic material (as above characterized) (b) low molecular weight aliphatic diol of formula (1), and (c) hydrophobic compound (as above characterized) and (d) nonionic surfactant compound (as above characterized). Such a polyol blend is also a reaction product of any other minor additional components present in a starting mixture, as described above. In effect, during the heating (esterification), the phthalic acidic material becomes esterified by the hydroxyl groups of the polyhydric alcohol compounds present, thereby producing phthalate polyester polyols. When a modifier compound present in a starting mixture contains carboxyl groups, the resulting reaction product or polyol blend further contains esters of such compounds. A polyol blend reaction product is thus inherently a complex mixture of various esterified alcohols and certain other compounds.

The quantity of phthalate polyester polyol present in any given product is generally proportional to the quantity of phthalic acidic material present in a starting mixture. Such a phthalate polyester polyol is formed not only by the esterification reaction of aliphatic diol of formula (1) with phthalic acidic material, but also by esterification reactions of such phthalic acidic material with other hydroxyl-group containing compounds present in a starting mixture.

The fact that a product of this invention is an interreacted system derived from the starting components present in a starting mixture can be demonstrated by any convenient means. When, for example, a starting mixture and a corresponding product mixture are examined by HPLC (high pressure liquid chromatography) it is found that the reaction product has a most substantially altered composition compared to that of the starting mixture.

Also, HPLC analysis shows that a polyol blend reaction product of this invention has a substantially different composition from a mixed composition which has been prepared by admixing together (a) a phthalic acid starting material esterified with only an aliphatic diol of formula (1) (such as a reaction product of phthalic anhydride with diethylene glycol) under similar process conditions to those process conditions used in the practice of the present invention, and (b) a mixture of hydrophobic compound and polyalkoxylated compound as above characterized (and other optional additives) to form a mixture.

Further, HPLC analysis of a product polyol blend appears to characteristically show peaks in the 15 to 17 minute range when using a Regis octadecylsilane column with 5 micron packing and having a length of about 25 centimeters, such peaks appear to be absent when mere physical mixtures of nonionic surfactant compound and/or hydrophobic compound in a phthalate polyester polyol made with a low molecular weight diol (e.g. formula (1) diol) are involved.

The merely admixed hydrophobic compound, however, is characteristically only very slightly soluble in a phthalate polyester polyol such as diethylene glycol phthalate. Not only does a two-phased mixture result from such a mixing attempt, but also no appreciable change or improvement in the fluorocarbon compatibility of the phthlate polyester polyol blend is observed.

Furthermore, in the case of the class of preferred liquid reaction products of this invention which have incorporated into a starting mixture a high molecular weight nonionic propoxylate ethoxylate compound, it is found by HPLC analysis that such products display a characteristically different composition from that shown by, for example, a diethylene glycol phthalate polyol to which has been added such a nonionic compound. Thus, the present polyol blends are distinctly different from the mixtures shown in Wood U.S. patent application Ser. No. 725,394 filed Apr. 22, 1985, now U.S. Pat. No. 4,595,711 and in Wood U.S. patent application Ser. No. 622,670 filed June 20, 1984, now U.S. Pat. No. 4,529,744 issued July 16, 1985. The liquid polyol blend reaction products of the present invention characteristically display different fluorocarbon compatibility compared to corresponding polyol blends made from heated starting mixtures comprised of only phthalic acidic material, formula (1) diol, and high molecular weight nonionic propoxylate ethoxylate compound. Such latter starting mixtures are shown in copending U.S. patent application Ser. No. 755,678 filed on even date herewith.

The Freon solubility capabilities of a product phthalate polyester polyol blend, or of a resin prepolymer blend made therefrom, can be readily determined, particularly when such a polyol blend is a clear liquid. Most product polyols of this invention are clear liquids, although their color can range from water white (or colorless) to dark brown or amber. Product polyols produced through the use of phthalate bottoms in a starting mixture have a black color which is characteristically very dense, and it is presently difficult if not impossible to measure accurately by known techniques the Freon solubility capability or characteristics of such a black liquid product polyol. For present purposes generally, freon solubility is conveniently measured or defined as the maximum amount of trichlorofluoromethane (known commercially as Freon 11, available from the duPont Company) which can be dissolved in a polyol blend. However, product polyols made from phthalate bottoms do produce cellular polymers when reacted with isocyanates as taught herein which have excellent physical characteristics, such as tumble friability.

Resin Prepolymer Blends

Resin prepolymer blends of this invention can be easily and conveniently prepared from a product polyol blend of this invention by admixing therewith a urethane-forming, an isocyanurate-forming, or mixed polyurethane/polyisocyanurate forming catalyst or catalyst system. In addition, a fluorocarbon blowing agent is admixed therewith (dissolved therein).

Many different types of resin prepolymer blends using polyols of this invention can be prepared using the additives, polyols, and know-how familiar to those skilled in the art. The polyols of this invention appear to be readily blendable with such materials.

One presently preferred and illustrative class of prepolymer resin blend formulations which incorporate polyol blends of this invention and which is particularly suitable for making polyisocyanurate foams is characterizable as shown in the following Table IV:

TABLE IV

Preferred Resin Precursor Blends For Polyisocyanurate Foams
(100 weight percent basis)

| Item No. | Component | wt. % Preferred range | wt. % More Preferred Range |
|---|---|---|---|
| (A) | polyol blend | 20–65 | 40–60 |
| (B) | trimerization catalyst | 1.0–7.0 | 1.5–5.0 |
| (C) | cell stabilizing surfactant | 0–5.0 | 1.0–2.0 |
| (D) | fluorocarbon blowing agent | 20–40 | 25–35 |
| (E) | low molecular wt. nonionic surfactant compounds | 0–20 | 0–10 |
| (F) | high molecular wt. nonionic surfactant | 0–20 | 0–10 |
| (G) | other additives | 0–15 | 0–10 |

One presently preferred and illustrative class of prepolymer resin blend formulation which incorporate polyol blends of this invention and which is particularly suitable for making polyurethane foams is characterizable as shown in the following Table V.

TABLE V

Preferred Resin Precursor Blends For Polyurethane Foams
(100 weight percent basis)

| Item No. | Component | wt. % Preferred range | wt. % More Preferred Range |
|---|---|---|---|
| (A) | polyol blend | 20–65 | 40–60 |
| (B) | urethane forming catalyst | 0.5–10.0 | 2.0–4.0 |
| (C) | cell stabilizing surfactant | 0.5–3.0 | 1.0–2.0 |
| (D) | fluorocarbon blowing agent | 0–30 | 5–20 |
| (E) | water | 0–20.0 | 0–2 |
| (F) | low molecular wt. nonionic surfactant | 0–10 | 0–5 |
| (G) | high molecular wt. nonionic surfactant | 0–10 | 0–5 |

Preferably the viscosity of such a B-side resin prepolymer blend formulation of Table IV or V ranges from about 100 to 2000 centipoises at 25° C. (measured, for example, with a Brookfield viscometer) and the hydroxyl number thereof falls in the range from about 80–300.

EMBODIMENTS

The present invention is further illustrated by reference to the following examples. Those skilled in the art will appreciate that other and further embodiments are obvious and within the spirit and scope of this invention from the teachings of these present examples taken with the accompanying specification. Unless otherwise indicated all product polyol blends of this invention hereinbelow described have a saponification number of from about 130 to 400.

Starting Materials

Example A

A diethylene glycol phthalate for testing and comparison purposes is prepared as follows:

To a 3 liter, four-neck, round-bottom flask equipped with a stirrer, thermometer, nitrogen inlet tube, and a distilling head consisting of a straight adapter with a sealed-on Liebig condenser there is added 740 grams (5 moles) of phthalic anhydride, and 1060 grams (10 moles) of diethylene glycol. The mixture is heated to 220° C. with stirring and kept at this temperature until the rate of water being removed slowed down.

Stannous octoate (100 ppm) is then added to the mixture and the heating continued until the acid number reaches 6.2. The reaction mixture is then cooled to room temperature and analyzed. The hydroxyl number is found to be 288 and the acid number 6.2 Diethylene glycol is added to the mixture to increase the hydroxyl number to 315.

The product includes diethylene glycol phthalate molecules. This product is a colorless liquid which has a hydroxyl number of about 315 and has a viscosity of about 2500 centipoises at 25° C. measured with a Brookfield viscometer operating at 1.5 rpm with a #3 spindle.

Example B

A specimen of a phthalic anhydride bottoms composition is obtained from Stepan Company having:
 (a) a phthalic anhydride content of about 60 weight percent (total composition basis),
 (b) a hydroxyl number estimated to be about 0, and
 (c) an acid number estimated to be about 700.

The phthalic anhydride bottoms used as a starting material in the practice of the present invention results from the process of converting o-xylene to phthalic anhdyride.

Distillation of the reaction product known as "crude" or "PA crude" results in a first distillate known as "light ends" or "phthalic anhydride light ends", a second distillate comprising substantially pure phthalic anhydride and a residue known as bottoms or phthalic anhydride bottoms. The crude, the light ends and the bottoms can each be regarded as having a somewhat variable composition, such compositional variations being the result of variations in the starting o-xylene feed, and also of variations in the exact conditions employed for the respective process steps.

In actual commercial practice, it is believed that, in a bottoms composition, the quantity of phthalic anhydride present can range from a low of about 10 weight percent to a high of about 99 weight percent on a 100 weight percent total bottoms basis, with the balance up to 100 weight percent thereof in any given bottoms compositions being mainly trimellitic acid and/or trimellitic acid anhydride plus insolubles.

Similarly, in actual commercial practice, it is believed that, in a light ends composition, the quantity of phthalic anhydride present can range from a low of about 45 weight percent up to a high of about 90 weight percent on a 100 weight percent total light ends basis, with the balance up to 100 weight percent thereof in any given light ends composition being mainly benzoic acid, (of benzoic acid anhydride) and maleic acid anhydride (or maleic acid).

Example C

A starting phthalic anhydride bottoms composition is selected which has the following characteristics:

| Characteristics | Broad Range | Preferred Range |
|---|---|---|
| hydroxyl number | about 0 | about 0 |
| acid number | 100-750 | 450-750 |
| phthalic anhydride content | 10-99 wt % | 50-95 wt % |

In the foregoing table, the phthalic anhydride weight percentage is based upon total compositional weight of a starting phthalic anhydride bottoms composition in the esterification procedure.

Alternatively, a crude or light ends composition is employed. With such a starting phthalic anhydride bottoms composition is admixed at least one polyol of formula (1) above to produce an initial mole ratio of said polyol to said phthalic anhydride bottoms composition in the range from about 1.9 to 3.0 based upon an estimate of the total acid (e.g., carboxylic acid and/or carboxylic acid anhydride) content of said phthalic anhydride bottoms composition. A presently most-preferred polyol for reaction with phthalic anhydride bottoms starting material is diethylene glycol.

Although phthalic anhydride bottoms comprise mainly phthalic acid anhydride, the remaining components of the phthalic anhydride bottoms mainly appear to comprise components which are acidic in nature and which react with a polyol of formula (1) presumably to produce ester by-products, although the exact composition of the reaction product of a polyol of formula (1) and phthalic anhydride bottoms is at this time not known.

A condensate of diethylene glycol and a phthalic anhydride bottoms composition of Example B for testing and comparison purposes is prepared as follows:

To a 3-liter, four-neck, round-bottom flask equipped with a stirrer, thermometer, nitrogen inlet tube and a distilling head consisting of a straight adapter with a sealed-on Liebig condenser, there is added at ambient temperature and pressure 740 grams of the above pulverized phthalic anhydride bottoms and 1060 grams (10 moles) of diethylene glycol. The mixture is heated to 220° C. and kept at this temperature until the acid number of the reactant mixture is found to be about 7.0. The mixture is then cooled to room temperature and the hydroxyl number of the relatively viscous black liquid product is determined and found to be about 312. The mixture has a viscosity of about 25,000 centipoises at 25° C. measured using a Brookfield viscometer with a #3 spindle operating at about 1.5 rpm.

Example D

An alkoxylated glycerine is obtained from Stepan Company under the trade description "Stepanfoam Polyol 2403". This material has the following characteristics:
hydroxyl number: about 230-245
functionality: about 3
molecular weight: about 700

Example E

An alkoxylated sucrose is obtained from Stepan Company under the trade designation "Stepanfoam Polyol 3708". Such alkoxylated sucrose has the following characteristics:
hydroxyl number: about 365 to 395
functionality: about 8
molecular weight: about 1200

Example F

A 17006 pound batch of presently preferred nonionic block propoxylate ethoxylate of nonyl phenol is produced by first charging 3,900 lbs of appropriate nonyl phenol feed stock to an appropriate alkoxylation reactor of the proper size. This material is then heated to 110 C. and an appropriate amount of potassium hydroxide catalyst is added. After the addition of the catalyst, 4106 pounds of propylene oxide (about 35 moles of addition) is added slowly. Care should be taken to maintain a reaction temperature of between 110° C. to 160° C. during the addition of the propylene oxide. After this addition, the reactor is brought to approximately 110° C. and about 9000 pounds of ethylene oxide (about 65 moles of addition) are added to the reactor very slowly. This is a very exothermic reaction and care should be taken to maintain a reaction temperature of between about 110° to 160° C. The ethoxylation is terminated when the appropriate degree of ethoxylation is achieved; this should occur after approximately all of the 9000 pounds of ethylene oxide are added to the reactor. Proper agitation in the alkoxylation should be maintained during both ethylene oxide and propylene oxide additions. The product contains about 65 moles of condensed ethylene oxide in block form and about 35 moles of condensed propylene oxide in block form.

The product has the following characteristics:
molecular weight: about 4800
hydroxyl number: about 12
functionality: about 1
physical state: solid at 25° C.

Example G

A mixed ethoxylated propoxylated-ethoxylated butanol of formula (3B) is obtained as "Tergitol XH" from Union Carbide Company. This product is believed to have the following approximate characteristics:
molecular weight: about 2400 to 3500
hydroxyl number: about 13 to 24
functionality: about 1
physical state: solid at 25° C.
moles ethylene oxide condensed: about 20 to 50
moles propylene oxide condensed: about 20 to 50 See U.S. Pat. No. 3,078,315

Example H

An ethoxylated propoxylate ethoxylate is obtained as "Pluronic P-75" from BASF Wyandotte Company. This product is believed to have the following approximate characteristics:
molecular weight: about 3500 to 14000
hydroxyl number: about 8 to 32
functionality: about 2 physical state: solid at 25° C.
moles ethylene oxide condensed: 30 or more
moles propylene oxide condensed: 30 or more

Example I

An organic polyisocyanate trimerization catalyst is obtained under the trade designation "Hex-Cem 977" from the Mooney Chemical Company. This catalyst is believed to comprise potassium octoate in glycol solution.

Example J

A silicone cell stabilizing surfactant is obtained under the trade designation "DC-193" from Dow Corning Company. This surfactant is believed to be comprised of a polyalkylene oxide silicone.

Example K

An aromatic amine polyol is obtained under the tradename "Thanol R-350-X" from Texaco Chemical Corporation. The polyol is believed to be a phenolic based aromatic amine.
hydroxyl number: about 530
functionality: about 4 to 5
equivalent weight: about 105 (calculated)

Example L

A trimerization catalyst is obtained under the tradename "TMR-2" from Air Products Company. The catalyst is believed to be an ammonium compound of an organic base.

Example M ("C-68 Methyl Esters") comprises (82% of methyl oleate, 16% methyl palmitate, 2% unknowns) available from Stepan Company.

Example N ("Amidox C-5") Ethoxylated Cocoamide available from Stepan Company

Example O ("Eastman Methyl Esters") Mixture of 3.1% methyl laurate, 1.1% methyl myristate, 18.8% methyl palmitate, 13.7% methyl steorate, 34.7% methyl oleate, 28.4% methyl linoleate, available from Eastman Chemical Company

Example P

Varonic K-215 Ethoxylated cocoamine available from Sherex Chemical Company

Example Q ("Pluronic P-65") Ethoxylated propoxylated ethoxylated surfactant available from BASF Corporation

Example R ("Makon 6"), Ethoxylated nonyphenol available from Stepan Company

Example S

A condensate of phthalic anhydride with a triol for testing and comparison purposes is prepared as follows:
To a 5 liter, four-neck, round-bottom flask equipped with a stirrer, thermometer, nitrogen inlet tube, and a distilling head consisting of a straight adapter with a sealed-on Liebig condenser, there is added 1480 grams (10 moles) of phthalic anhydride and 2680 grams (20 moles) of 1,1,1-trimethylolpropane. The mixture is heated to 190° C. with a stirring and kept at this temperature until the acid number is 5. The reaction mixture is then cooled to room temperature and analyzed. The hydroxyl number is found to be 565.2. The product is gel-like material at 25° C.

Example T

A polyol of phthalic anhydride with a triol (1,1,1-trimethylolpropane) and a hydrocarbon modifier is prepared as follows:
The procedure of Example II is repeated except that there is added to the starting mixture 442.0 grams (2.80 moles) of decyl alcohol. The reaction product is found to have an hydroxyl number of 541.9 but is a gel-like material at 25° C.
This example illustrates that triols tend to make phthalate polyester polyols which are excessively viscous even when a hydrocarbon modifier is present in a starting mixture.

Examples of the Invention

Example 1—Preparation Of A Polyol Blend From An Eastman Methyl Ester, Phthalic Anhydride, And Diethylene Glycol To a five liter, four-neck, round-bottom flask equipped with stirrer, thermometer, Barrett distilling receiver, condenser, and nitrogen inlet tube was charged 1351.8 grams of phthalic anhydride, 2063.4 grams of diethylene glycol, and 839.9 grams of Eastman methyl ester (21% by weight based on total weight of phthalic anhydride, diethylene glycol and such methyl ester).
This mixture was heated to 225° C. with constant agitation and with a constant nitrogen sparge. Theoretically, 164.4 grams of water and 90.8 grams of methanol (total 255.2 grams of material) formed and substantially all of such formed material was taken off at the distilling receiver. After this distillate material was collected, 200 ppm of stannous octoate was added to the flask as an esterification catalyst. Additional material removed from the distilling receiver was replaced by an equal weight of diethylene glycol. The heating was continued until the acid value of the product liquid was less than 4.0. This reaction (heating) was stopped at an acid value of 1.05. The product polyol had an hydroxyl number of 236.8, a viscosity of 713 cps at 25° C., and contained 0.04% water.

Example 2—Preparation Of A Polyol Blend From Soybean Oil, Phthalic Anhydride, And Diethylene Glycol To a three liter, four-neck, round-bottom flask equipped with stirrer, thermometer, Barrett distilling receiver, condenser, and nitrogen inlet tube was charged 592.0 grams of phthalic anhydride, 1060.0 grams of diethylene glycol, and 428.0 grams of soybean oil. This mixture was heated to 225° C. with constant agitation and with a constant nitrogen sparge. After approximately 95% of the theoretical water had been removed, 200 ppm of stannous octoate was added to the flask. Any additional material taken from the distilling receiver was replaced by an equal weight of diethylene glycol. The reaction was carried out until the acid value was approximately 0.5 and the hydroxyl number was about 248.0. The viscosity was found to be 972 cps at 25° C. measured using a Brookfield viscometer (model LVT) with a number 3 spindle at a speed of 6 rpm.

Example 3—Preparation Of A Polyol Blend Of Eastman Methyl Ester, Example K Material, Phthalic Anhydride, Diethylene Glycol To a three liter, four-neck, round bottom flask equipped with stirrer, thermometer, Barrett distilling receiver, condenser, and nitrogen inlet tube, was charged 579.3 grams of phthalic anhydride, 930.1 grams of diethylene glycol, 396.3 grams of Eastman methyl ester (21% by weight based on total weight of phthalic anhydride diethylene glycol, Eastman methyl ester, and Example K material) and 94.3 grams of Example K material (5% by weight based on such total weight). This mixture was heated to 225° C. with constant agitation and with a constant nitrogen sparge. Theoretically, 70.5 grams of water and 42.8 grams of methanol (total of 113.3 grams of material) formed and substantially all of such formed material was taken off at the distilling receiver. After this material was collected, 200 ppm of stannous octoate was added to the flask as an esterification catalyst. Additional material removed from the distilling receiver was replaced by an equal weight of diethylene glycol. The heating was carried out until the acid value of the product liquid polyol reached 3.9. The product polyol had an hydroxyl number of 240.5, a viscosity of 588 cps at 25° C. and containing 0.04% water.

Example 4—Preparation Of A Decyl Alcohol, Example K Material, Phthalic Anhydride, Diethylene Glycol To a three liter, four-neck, round bottom flask equipped with stirrer, thermometer, Barrett distilling receiver, condenser, and nitrogen inlet tube, was charged 444.0 grams of phthalic anhydride, 548.0 grams of diethylene glycol, 148.7 grams of decyl alcohol (13% by weight based on total weight of phthalic anhydride diethylene glycol, such methyl ester, and Example K material) and 57.2 grams of Example K material (5% by weight based on such total weight). This mixture was heated to 225° C. with constant agitation and with a constant nitrogen sparge. Theoretically, 54.0 grams of water formed and substantially all of such formed material was taken off at the distilling receiver. After this material was collected, 200 ppm of stannous octoate was added to the flask as an esterification catalyst. Additional material removed from the distilling receiver was replaced by an equal weight of diethylene glycol. The heating was carried out until the acid value of the product liquid polyol reached 0.9. The product polyol had an hydroxyl number of 255.4, a viscosity of 1036 cps at 25° C. and containing 0.06% water.

Example 5—Polyol Freon Solubility

Freon solubility in each of the polyols of Examples 1-4 is determined by measuring the maximum amount of trichlorofluoromethane (Freon 11, available commercially from the E.I. DuPont Company) which can be dissolved in each polyol before such becomes cloudy. This solubility is expressed in parts per hundred parts polyol (pphP).

Thus, fifty grams of polyol were added to an 180 ml beaker. The polyol, beaker, and a spatula were weighed. Freon R-11 was added with stirring to the polyol until it became cloudy. This mixture was then stirred until enough freon evaporated to clear the blend. The weight of freon remaining was then determined. The results were as follows:

TABLE VI

| Polyol Freon Solubility | |
|---|---|
| Polyol | pph |
| Example 1 | 37.2 |
| Example 2 | 47.0 |
| Example 3 | 42.0 |
| Example 4 | 49.4 |

Example 6—Resin Prepolymer

Each of the polyols of Examples 1-4 are mixed (blended with) a urethane/isocyanurate forming catalyst and with a cell stabilizing surfactant to form a resin prepolymer blend suitable for reacting with organic isocyanate to form a cellular polymer. Each such resin prepolymer blend had the following composition:

TABLE VII

| Resin Prepolymer Composition (100 wt. % total weight basis) | |
|---|---|
| Component | weight percent |
| polyol | 94 |
| potassium octoate[1] | 4 |
| silicons surfactant[2] | 2 |

Table VII footnotes
[1]Example "I"
[2]Example "J"

When the resin prepolymer blend composition of Examples 3 and 4 admixed with Mondur MR and foamed it is found that a cellular polymer having uniform small cell sizes is produced having improved tumble friability over the foam prepared using resin prepolymer blends containing polyols of Examples 1 and 2.

Example 7—Resin Prepolymer Freon Solubility

Freon solubility in each of these resin prepolymer blends of Example 6 is determined by measuring the maximum amount of trichlorofluoromethane (Freon 11 available commercially from the E.I. Dupont Company) which can be dissolved in each resin prepolymer blend before such becomes cloudy. Thus, solubility is expressed in parts per hundred parts resin (pphr).

Thus, fifty grams of each resin prepolymer blend were added to an 180 ml beaker. The resin, beaker, and a spatula were weighed. Freon R-11 was added with stirring to the resin until it became cloudy. This mixture was then stirred until enough freon evaporated to clear the blend. The weight of freon remaining was then determined.

The results were as follows:

TABLE VIII

| Resin Prepolymer Freon Solubility | |
|---|---|
| Resin Prepolymer From Polyol of: | pphr |
| Example 1 | 49.8 |
| Example 2 | 57.0 |
| Example 3 | 65.8 |
| Example 4 | 65.4 |

Examples 8-15—Hydrocarbon Modified Polyols Containing A Post-Formation Admixed High Molecular Weight Nonionic Surfactant Following the procedure of the preceding Example 1 various self-compatibilizing polyol blends are prepared from three-component starting mixtures containing a hydrocarbon modifier.

The starting components and their respective gram quantities are shown in Table IX below. Each product polyol is a clear liquid whose acid number hydroxyl number and viscosity are also shown in such Table IX.

Each product polyol is formulated into a resin prepolymer blend as described in Example 6. Each such resin prepolymer blend is reactable with organic isocyanate to produce a cellular polymer with excellent physical properties.

Also, each product polyol and each resin prepolymer blend has admixed and dissolved therein a block copolymer of the type described in Example F. The resulting mixtures are all liquids.

Each product polyol and the corresponding resin prepolymer blend made therefrom is evaluated for Freon solubility by the respective procedures of Examples 5 and 7, and the results are shown in such Table IX. Since the Freon solubility (similarly measured) for a condensate of 1 mole of phthalic anhydride with 2 moles of diethylene glycol is about 15 pphP, the reacted hydrocarbon modifier improves Freon solubility in each case. Also, the results show also that post reaction admixture of this block copolymer with a product polyol has a synergistic effect in improving the fluorocarbon solubility in the resin.

ture, the product polyol produced polyurethane-polyisocyanurate foam had tumble friabilities of 39.99 and 29.36 percent, respectively. Thus, the mixture used in making polyol blends of this invention produces foams with superior tumble friability.

TABLE X

| Tumble Friabilities Of Polyurethane-Polyisocyanurate Foams Prepared From Self-Compatibilized Phthalate Polyols | | | |
|---|---|---|---|
| Example | 16 | 17 | 18 |
| Components, weight in grams | | | |
| Phthalic anhydride | 444.0 | 444.0 | 444.0 |
| Diethylene glycol | 521.0 | 545.2 | 570.7 |
| Decyl alcohol | 227.8 | 175.4 | 120.1 |
| PO—EO blocked polymer | — | 58.5 | 120.1 |
| Characteristics | | | |
| Acid number | 3.5 | 1.4 | 0.6 |
| Hydroxyl number | 253.5 | 252.9 | 251.6 |
| Viscosity, CPS at 25° C. | 630.0 | 785.0 | 1228.0 |
| Foam Formulation | | | |
| Polyol, grams | 100.0 | 100.0 | 100.0 |
| DC-193, grams | 1.0 | 1.0 | 1.0 |
| Hexchem 977, grams | 5.7 | 3.2 | 2.7 |
| TMR-30, grams | 1.1 | 0.6 | 0.5 |
| Freon 11, grams | 49.0 | 49.0 | 50.0 |
| PAPI-27, grams | 199.0 | 190.4 | 187.8 |
| Foam Properties | | | |
| Density, PCF | 1.76 | 1.80 | 1.77 |
| Tumble friability, % (ASTM C421-77) | 53.63 | 39.99 | 29.36 |

TABLE X

| Hydrocarbon Modified Phthalate Polyols With And Without Post Added EO PO Block Copolymer | | | | | | | | |
|---|---|---|---|---|---|---|---|---|
| Example Number | 8 | 9 | 10 | 11 | 12 | 13 | 14 | 15 |
| Components, weight in grams | | | | | | | | |
| Phthalic Anhydride | 540 | 592 | 630 | 1351 | 592 | 296 | 444 | 592 |
| Diethylene Glycol | 645 | 1060 | 978 | 2063 | 1060 | 530 | 795 | 1060 |
| (Hydrocarbon Modifier) | | | | | | | | |
| Alfol 12-14GC | 315 | — | — | — | — | — | — | — |
| Soybean Oil | — | 428 | — | — | — | — | — | — |
| Linolenic Acid | — | — | 399 | — | — | — | — | — |
| Eastman Methyl Esters (1) | — | — | — | 840 | — | — | — | — |
| Oleic Acid | — | — | — | — | 428 | — | — | — |
| C-68 Methyl Esters (2) | — | — | — | — | — | 224 | — | — |
| Linoleic Acid | — | — | — | — | — | — | 321 | — |
| Tallow | — | — | — | — | — | — | — | 448 |
| Characteristics | | | | | | | | |
| Acid Number | 0.5 | 0.5 | 0.4 | 1.1 | 0.4 | 4.0 | 0.6 | 1.4 |
| Hydroxyl Number | 233.0 | 248.0 | 242.0 | 237.0 | 294.0 | 250.0 | 295.0 | 258.0 |
| Viscosity, cps at 25° C. | 792.0 | 972.0 | 450.0 | 713.0 | 410.0 | 1500.0 | 396.0 | 700.0 |
| Freon Solubility | | | | | | | | |
| Polyol, pph | 74 | 47 | 50 | 37 | 45 | 49 | 49 | 38 |
| Resin, pph | 86 | 57 | 62 | 50 | 58 | 64 | 60 | 51 |
| Polyol + 5% Block EO PO Polymer Blended, pph | 77 | 51 | 54 | 44 | 47 | 52 | 52 | 44 |
| Resin + 5% Block EO PO Polymer Blended, pph | 105 | 81 | 80 | 72 | 71 | 69 | 67 | 61 |

Table X Footnotes:
(1) See Example O
(2) See Example M

Examples 16-18

To illustrate tumble friability for polyurethanepolyisocyanurate foam prepared from self-compatibilized polyols of this invention, polyol blends were prepared as shown in Table X below and these blends were then converted to cellular foams using a procedure similar to that of Example 6. The foams are then evaluated for tumble friability according to ASTM procedure C421-77. The data obtained are given in Table X below and such data show that the tumble friability of the foam prepared using a polyol containing 20 percent decyl alcohol had a tumble friability of 53.63 percent. When about 5 and 10 weight percent of an Example F material was reacted into the polyol mix-

Examples 19-24—Hydrocarbon Modified Polyols Containing Weight Nonionic Surfactant Following the procedure of the preceding Example 1, various self-compatibilizing polyol blends are prepared from three and four component starting mixtures each containing the same hydrocarbon modifier.

The starting components and their respective gram quantities are shown in Table XI below. Each product polyol is a clear liquid whose acid number, hydroxyl number and viscosity are shown also in such Table XI.

Each product polyol is formulated into a resin prepolymer blend as described in Example 6. Each such resin prepolymer is reactable with organic isocyanate to produce a cellular polymer with excellent physical properties.

Each product polyol and the corresponding resin prepolymer blend made therefrom is evaluated for Freon solubility using Freon 11 (trichlorofluoromethane) by the respective procedures of Examples 5 and 7. The results are shown in such Table XI.

Since the Freon solubility (similarly measured) for a condensate of 1 mole of phthalic anhydride with 2 moles of diethylene glycol is about 15 pphP, the three component hydrocarbon modified product polyol of Example 19 has improved Freon solubility by comparison. Also, each of the four component hydrocarbon modified, nonionic surfactant modified product polyols of Examples 20-24 has improved Freon solubility by comparison to the product polyol of Example 19.

When 5 weight percent of Example F material is post-blended with the Example 19 polyol, and freon solubility is measured, using the same freon, it is found that the maximum solubility is about the same as for the Example 20 polyol wherein the Example F material has been reacted. However, this freon solubility level is characteristically surprisingly higher than the freon solubility level achieved when a comparable amount of Example F material is dissolved in the diethylene glycol phthalate polyol of Example A where no hydrophobic compound is present. Consequently, the present invention makes possible the achievement of phthalate polyester polyol blends using formula (1) diols which are fluorocarbon compatibilizable with a propoxylate ethoxylate compound of the type taught, for example, in Wood U.S. Pat. No. 4,529,744, but, in the present polyol blend compositions, the same level of fluorocarbon solubility is achieved with a surprisingly smaller amount of such a propoxylate ethoxylate compound because of the presence in the present polyol blends of the reacted hydrophobic compound.

grams, (0.057 moles) of PO-EO block polymer (Example F) are also present during the reaction. The product is a liquid polyol having a viscosity of about 15,000 centipoises at 25° C. and a hydroxyl number of 299.0.

Preferably a given mixture of phthalic anhydride bottoms composition polyol, hydrocarbon modifier and nonionic surfactant in order for esterification to occur, is heated with mixing at a temperature ranging from about 190° to 240° C. (preferably from about 210° to 240° C.) under liquid phase conditions. This heating or contacting between hydrocarbon modifier, polyol and phthalic anhydride bottoms composition is continued until a desired extent of esterification has been achieved. Preferably such heating is continued until the resulting product reaches a hydroxyl number ranging from about 200 to 500 and an acid number ranging from about 0.5 to 7, and more preferably until such reaches a hydroxyl number ranging from about 270 to 400 and an acid number ranging from about 2 to 7.

It is surprising and unexpected fact that, despite the complex nature of the composition produced by reacting phthalic anhdyride bottoms with a diol of formula (1) a hydrocarbon modifier and nonionic surfactant as described herein there is produced a product polyol blend which can be readily and simply utilized for reaction with isocyanate to produce (in the presence of appropriate catalyst) polyisocyanurate foams which have excellent properties that appear generally to be about equal to the properties of corresponding foams made with esters produced by reacting substantially pure phthalic anhydride with polyol of formula (1) as in Example A.

Example 26

To a 5 liter, four-neck, round-bottom flask equipped with a stirrer, thermometer, nitrogen inlet tube, and a distilling head consisting of a straight adapter with a sealed-on Liebig condenser, there is added 740 grams (5

TABLE XI

| Hydrocarbon Modified Phthalate Polyols Containing Reacted Nonionic Surfactant | | | | | | |
|---|---|---|---|---|---|---|
| Example Number | 19 | 20 | 21 | 22 | 23 | 24 |
| Components, weight in grams | | | | | | |
| Phthalic Anhydride | 1352 | 570 | 615 | 620 | 620 | 622 |
| Diethylene Glycol | 2063 | 930 | 985 | 981 | 980 | 979 |
| (Hydrocarbon Modifier) | | | | | | |
| Eastman Methyl Esters[1] | 840 | 396 | 420 | 420 | 420 | 420 |
| (Nonionic Surfactants) | | | | | | |
| Block PO—EO Polymer[2] | — | 94 | — | — | — | — |
| Pluronic P-65[3] | — | — | 100 | — | — | — |
| Makon 6[4] | — | — | — | 100 | — | — |
| Varonic K-215[5] | — | — | — | — | 100 | — |
| Amidox C-5[6] | — | — | — | — | — | 100 |
| Analysis | | | | | | |
| Acid Number | 1.1 | 3.9 | 3.9 | 0.55 | 1.9 | 1.6 |
| Hydroxyl Number | 237.0 | 240.0 | 235.0 | 234.0 | 236.0 | 242.2 |
| Viscosity, cps at 25° C. | 713.0 | 588.0 | 925.0 | 719.0 | 600.0 | 538.0 |
| Freon Solubility | | | | | | |
| Polyol, pph | 37.0 | 42.0 | 43.0 | 49.0 | 47.0 | 45.0 |
| Resin, pph | 50.0 | 66.0 | 66.0 | 62.0 | 57.0 | 56.0 |

Table XI Footnotes:
[1]See Example O
[2]Same polymer as described in Example F
[3]See Example Q
[4]See Example R
[5]See Example P
[6]See Example N

Example 25

The procedure of Example C is repeated except that 214.0 grams (1.35 moles) of decyl alcohol and 214.0 moles) of phthalic anhydride, 1180 grams (10 moles) of 1,6-hexanediol, and 228.7 grams (1.448 moles) of decyl alcohol and 228.7 grams (0.061 moles) of Example F material. The mixture is heated to 220° C. with stirring and kept at this temperature until the acid number is 6 or lower. The reaction mixture is then cooled to room temperature and analyzed. The product is a liquid polyol at 25° C. The hydroxyl number is found to be 282.0 and the viscosity is about 1200 centipoises at 25° C. The product has a Freon solubility of about 55 pphP.

Example 27

To a 5 liter, four-neck, round-bottom flask equipped with a stirrer, thermometer, nitrogen inlet tube, and a distilling head consisting of a straight adapter with a sealed-on Liebig condenser, there is added 740 grams (5 moles) of phthalic anhydride, 1940 grams (10 moles) of tetraethylene glycol 304.7 grams (1.93 moles) of decyl alcohol and 152 grams (0.04 moles) of Example F material. The mixture is heated to 220° C. with stirring and kept at this temperature until the acid number reaches 6.

The reaction mixture is then cooled to room temperature and analyzed. The hydroxyl number of the colorless liquid product is found to be 220 and its viscosity is about 900 centipoises at 25° C. The product has a Freon solubility of about 60 pphP.

Example 28

To a 5 liter, four-neck, round-bottom flask equipped with a stirrer, thermometer, nitrogen inlet tube, and a distilling head consisting of a straight adaptor with a sealed-on Liebig condenser, there is added 740 grams (5 moles) of phthalic anhydride, 1060 grams (10 moles) of diethylene glycol, 67.0 grams (0.5 moles) of trimethylolpropane and 222 grams (1.40 moles) of decyl alcohol and 277 grams (0.06 moles) of Example F material. The mixture is heated to 220° C. with stirring and kept at this temperature until the acid number is 6. The hydroxyl number of the colorless liquid polyester polyol phthalate is found to be 327.0.

This example illustrates that triols in controlled amount can be incorporated in a starting mixture with phthalic anhydride, diol of formula (1), and hydrocarbon modifier without producing gelation and also that the product has improved Freon solubility compared to the same composition made without any hydrocarbon modifier.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim:
1. A process for preparing a high aromatic content low acid number self-compatibilized phthalate polyester polyol blend comprising the step of heating at a temperature ranging from about 180° to 240° C. a starting mixture which comprises on a 100 mole percent total basis:
(A) from about 15 to 40 mole percent of at least one phthalic acidic material selected from the group consisting of phthalic anhydride, phthalic acid, isophthalic acid, terephthalic acid, and mixtures thereof,
(B) from about 40 to 75 mole percent of at least one low molecular weight aliphatic diol characterized by the generic formula:

$$HO-R^1-OH$$

where: $R^1$ is a divalent radical selected from the group consisting of
(a) alkylene radicals each containing from 2 through 6 carbon atoms, and
(b) radicals of the formula:

$$-(R^3O)_n-R^3-$$

where: $R^3$ is an alkylene radical containing from 2 through 3 carbon atoms, and n is an integer of from 1 through 3, and
(c) mixtures thereof, and
(C) from about 0.4 to 28 mole percent of a mixture of:
(a) least one hydrophobic compound which is characterized by:
(1) having an equivalent weight of from about 130 to 900,
(2) containing from about 8 to 60 carbon atoms per molecule, and
(3) containing at least one and not more than four radicals per molecule, said radicals being selected from the group consisting of carboxyl, hydroxyl, and mixtures thereof, and
(b) at least one nonionic surfactant compound which is characterized by:
(1) containing from about 10 to 600 carbon atoms per molecule,
(2) containing at least one and not more than four hydroxyl radicals per molecule,
(3) containing from about 4 to 240 radicals per molecule of the formula $$-(R^3O)-$$

where:
$R^3$ is as above defined,
the weight ratio in such mixture of said hydrophobic compound to said nonionic surfactant compound being in the range from about 1 to 10 to about 10 to 1 said heating being continued until a liquid reaction product is produced which is characterized by having:
(A) an hydroxyl number ranging from about 200 to 500,
(B) an acid number ranging from about 0.1 to 7,
(C) a saponification value ranging from about 130 to 400, and
(D) a viscosity ranging from about 200 to 50,000 centipoises at 25° C. measured using a Brookfield viscometer.
2. The process of claim 1 wherein said nonionic surfactant compound includes from and including 0 to about 1.0 mole percent of at least one nonionic propoxylate ethoxylate compound having a molecular weight of from about 1200 to 13,000.
3. The process of claim 2 wherein said propoxylate ethoxylate compound is characterized by having:
(1) a molecular weight of at least from about 3000 to 8000,
(2) a solubility in diethylene glycol phthalate to such an extent that at least 5 parts by weight are soluble in each 100 parts by weight of a diethylene glycol phthalate (which is a stoichiometric reaction product of one mole of phthalic acid anhydride with two moles of diethylene glycol (or equivalent),
(3) at least one block polyoxypropylene group which contains from about 25 to 50 repeating propoxy units, (4) at least one block polyoxyethylene group which contains from about 40 to 125 repeating ethoxy units, and (5) both a hydrophobic moiety and a hydrophilic moiety, provided that the total alkoxyl content includes at least about 40 weight percent of ethylene oxide.

4. The process of claim 2 wherein, after said heating, for each 100 parts by weight of such reaction product from 0 to about 30 parts by weight of at least one said propoxylate ethoxylate compound is admixed with and dissolved in said reaction product while maintaining a temperature ranging from about 50° to 100° C., provided that the total quantity of said propoxylate ethoxylate compound present in said reaction product ranges from greater than 0 to about 30 parts by weight for each 100 parts by weight of said polyol blend product.

5. The process of claim 1 wherein during said heating said starting mixture further contains on such 100 mole percent total starting mixture basis from greater than 0 to about 5 mole percent of at least one further polyol selected from the group consisting of glycerol, trimethylolpropane, sorbitol, trimethylolethane, pentaerythritol, and mixtures thereof.

6. The process of claim 1 wherein during said heating said starting mixture further contains, on such 100 mole percent total starting mixture basis, from greater than 0 to about 10 mole percent of at least one further acid compound selected from the group consisting of trimellitic anhydride, trimellitic acid, and mixtures thereof.

7. The process of claim 1 wherein during said heating said starting mixture further contains on such 100 mole percent total starting mixture basis from greater than 0 to about 10 mole percent of at least one polycarboxylated aliphatic acid compound selected from the group consisting of adipic acid, glutaric acid, succinic acid, and mixtures therof.

8. The process of claim 1 wherein during said heating said phthalic acidic material comprises a phthalic anhydride bottoms composition.

9. The process of claim 1 wherein during said heating said temperature ranges from about 200° to 240° C.

10. The process of claim 2 wherein said phthalic acidic material comprises phthalic anhydride, said aliphatic diol comprises diethylene glycol, said hydrophobic compound comprises decyl alcohol, and said nonionic propoxylate ethoxylate compound is characterized by having:

(1) a molecular weight of at least from about 3000 to 8000, (2) a solubility in diethylene glycol phthalate to such an extent that at least 5 parts by weight are soluble in each 100 parts by weight of a diethylene glycol phthalate (which is a stoichiometric reaction product of one mole of phthalic acid anhydride with two moles of diethylene glycol (or equivalent), (3) at least one block polyoxypropylene group which contains from about 25 to 50 repeating propoxy units, (4) at least one block polyoxyethylene group which contains from about 40 to 125 repeating ethoxy units, and (5) both a hydrophobic moiety and a hydrophilic moiety, provided that the total alkoxyl content includes at least about 40 weight percent of ethylene oxide.

11. A self-compatiblized phthalate polyester polyol blend comprising a reaction product of a starting mixture which comprises on a 100 mole percent total basis:

(A) from about 15 to 40 mole percent of at least one phthalic acidic material selected from the group consisting of phthalic anhydride, phthalic acid, isophthalic acid, terephthalic acid, and mixtures thereof, (B) from about 40 to 75 mole percent of at least one low molecular weight aliphatic diol characteristically by the generic formula:

$$HO-R^1-OH$$

where: $R^1$ is a divalent radical selected from the group consisting of
(a) alkylene radicals each containing from 2 through 6 carbon atoms, and
(b) radicals of the formula:

$$-(R^3O)_n-R^3-$$

where: $R^3$ is an alkylene radical containing from 2 through 3 carbon atoms, and n is an integer of from 1 through 3, and
(c) mixtures thereof, and (C) from about 0.4 to 28 mole percent of a mixture of:
(a) least one hydrophobic compound and at least one polyalkoxylated compound wherein such mixture the weight ratio of said hydrophobic compound to said polyalkoxylated compound ranges from about 0.1 to 10 to 1.

each said hydrophobic compound being characterized by:
(1) having an equivalent weight of from about 130 to 900,
(2) containing from about 8 to 60 carbon atoms per molecule, and
(3) containing at least one and not more than four radicals per molecule, said radicals being selected from the group consisting of carboxyl, hydroxyl, and mixtures thereof, and each said polyalkoxylated compound being characterized by:
(1) containing from about 10 to 190 carbon atoms per molecule,
(2) containing at least one and not more than four hydroxyl radicals per molecule,
(3) containing from about 4 to 70 radicals per molecule of the formula $$-(R^3O)-$$

where: $R^3$ is as above defined,
said reaction product being produced by the process of claim 1 and being a liquid which is characterized by having:
(i) an hydroxyl number ranging from about 200 to 500,
(ii) an acid number ranging from about 0.10 to 7.0,
(iii) a saponification value ranging from about 130 to 400, and
(iv) a viscosity ranging from about 200 to 50,000 centipoises measured at 25° C. using a Brookfield viscometer.

12. The polyol produced by the process of claim 1.
13. The polyol produced by the process of claim 2.
14. The polyol produced by the process of claim 3.
15. The polyol produced by the process of claim 4.

16. The polyol produced by the process of claim 5.
17. The polyol produced by the process of claim 6.
18. The polyol produced by the process of claim 7.
19. The polyol produced by the process of claim 8.
20. The polyol produced by the process of claim 10.
21. The polyol blend of claim 11 wherein said starting mixture further contains, on such 100 mole percent total weight basis, from 0 to about 1.0 mole percent of at least one propoxylate ethoxylate compound having a molecular weight of from about 1200 to 13,000.
22. The polyol blend of claim 21 wherein said propoxylate ethoxylate compound is characterized by having:
 (1) a molecular weight of at least from about 3000 to 8000,
 (2) a solubility in diethylene glycol phthalate to such an extent that at least 5 parts by weight are soluble in each 100 parts by weight of a diethylene glycol phthalate (which is a stoichiometric reaction product of one mole of phthalic acid anhydride with two moles of diethylene glycol (or equivalent),
 (3) at least one block polyoxypropylene group which contains from about 25 to 50 repeating propoxy units,
 (4) at least one block polyoxyethylene group which contains from about 40 to 125 repeating ethoxy units, and
 (5) both a hydrophobic moiety and a hydrophilic moiety,
provided that the total alkoxyl content includes at least about 40 weight percent of ethylene oxide.
23. The process of claim 3 wherein said propoxylate ethoxylate compound is further characterized by having an ethylene oxide which ranges from about 55 to 75 weight percent based on total alkoxyl content.
24. The process of claim 22 wherein said propoxylate ethoxylate compound is further characterized by having an ethylene oxide which ranges from about 55 to 75 weight percent based on total alkoxyl content.
25. The process of claim 22 wherein said propoxylate ethoxylate compound is further characterized by having an ethylene oxide which ranges from about 60 to 70 weight percent based on total alkoxyl content.

* * * * *